Figure 1:
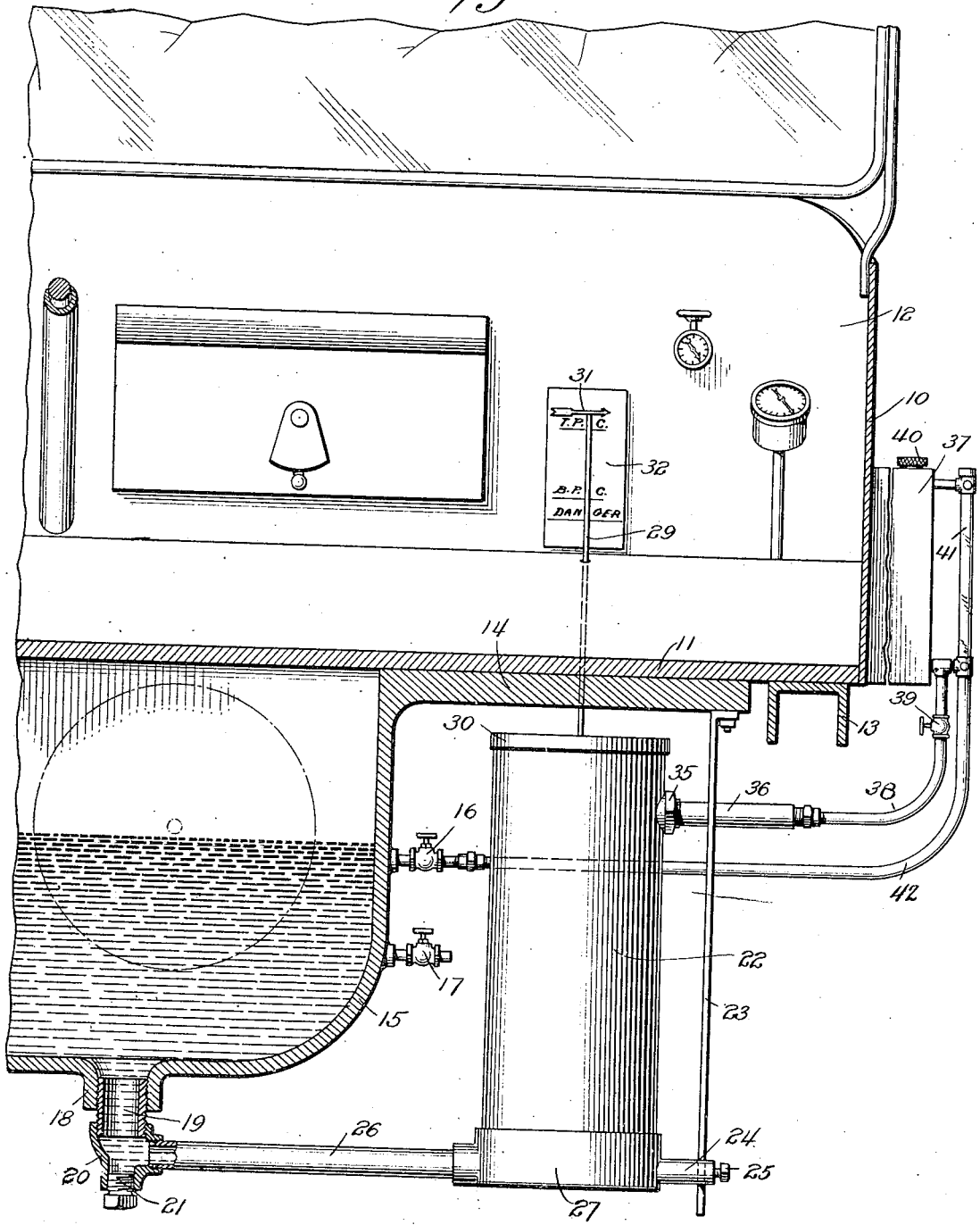

C. E. HENKELMAN.
AUTOMATIC OIL INDICATOR AND FEEDER.
APPLICATION FILED APR. 11, 1913.

1,109,417.

Patented Sept. 1, 1914.

2 SHEETS—SHEET 1.

WITNESSES
Oliver W. Holmes
J. Edwin Burch

INVENTOR
Charles E. Henkelman
BY Mmm & Co
ATTORNEYS

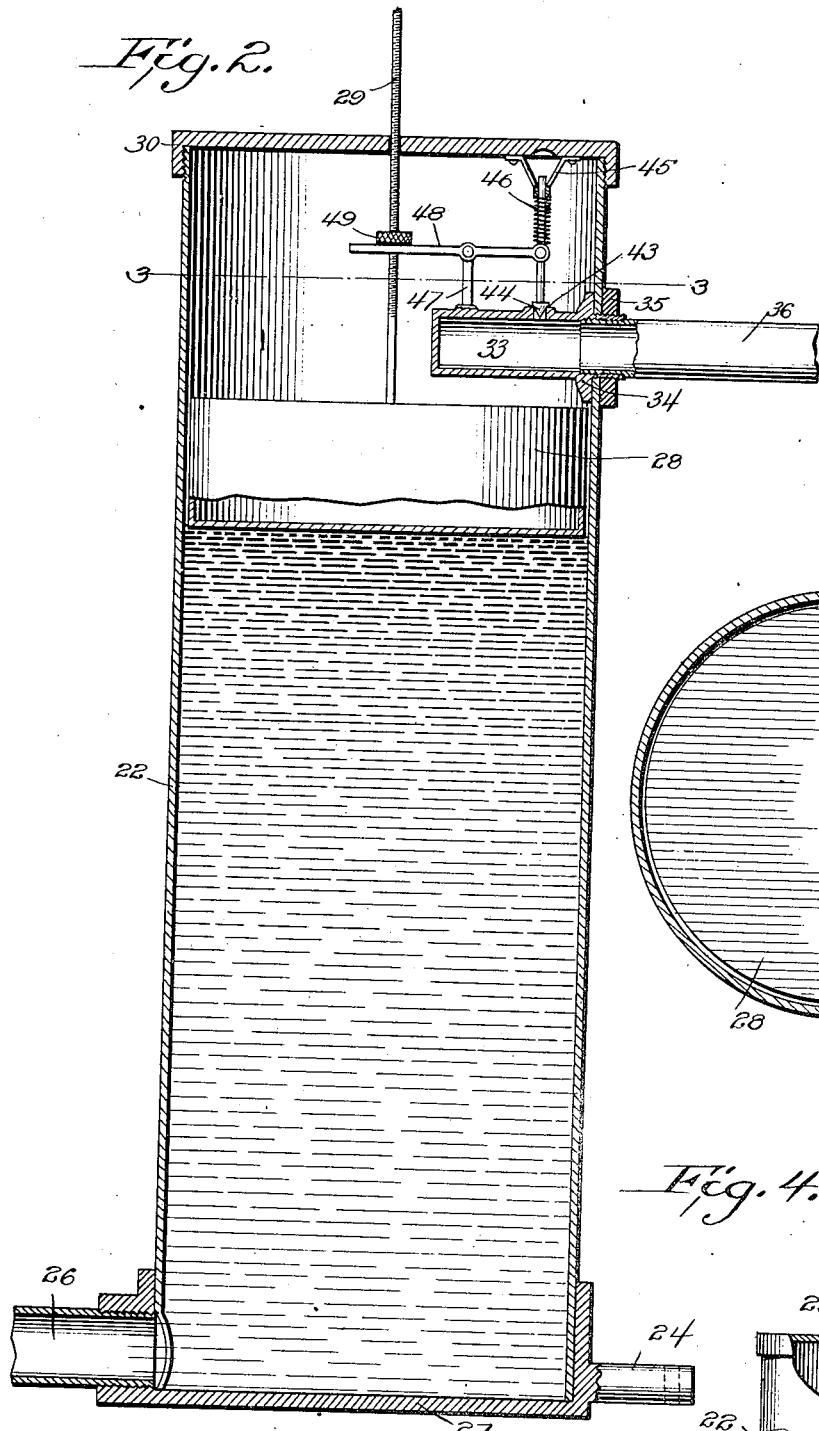

UNITED STATES PATENT OFFICE.

CHARLES EDWARD HENKELMAN, OF ATLANTIC CITY, NEW JERSEY.

AUTOMATIC OIL INDICATOR AND FEEDER.

1,109,417.  Specification of Letters Patent.  Patented Sept. 1, 1914.

Application filed April 11, 1913. Serial No. 760,440.

*To all whom it may concern:*

Be it known that I, CHARLES E. HENKELMAN, a citizen of the United States, and a resident of Atlantic City, in the county of Atlantic and State of New Jersey, have invented a new and Improved Automatic Oil Indicator and Feeder, of which the following is a full, clear, and exact description.

This invention relates to an improved automatic oil indicator and feeder for use on automobiles or gasolene motors employing a splash system of lubrication.

In the splash system of lubrication, the oil is contained in the fly wheel pit forming the lowest part of the crank case, and in order to determine whether the oil is at a proper height it is necessary to reach under the car and open the lowermost of a pair of petcocks provided on the crank case, so that if the oil exudes therefrom it is found that there is sufficient oil in the case. However, considerable annoyance is caused by having too much or not enough oil in the case, which results either in the fouling of the spark plugs, excessive carbonizing due to too much oil working past the piston, burning out of the bearings of the motor, or ruining of a person's clothes or the duster in reaching under the fender to open the petcocks.

In carrying out my invention, it is my object to avoid the above objections by providing an automatic oil indicator and feeder, wherein the operator will be positively informed at all times of the quantity of oil in the motor, simply by inspection of an indicator located at the dashboard, and in which, when the oil recedes a predetermined level, oil will be automatically supplied from a reserve tank and the supply cut off upon the oil reaching such level.

It is also an object to provide a mechanism of the above character which shall be simple and positive in operation, inexpensive and convenient of application to various types of gasolene motors, and unlikely to get out of working order.

With the above and other objects in view, the invention resides more particularly in the peculiar combination and arrangement of parts which will be illustrated as a preferred embodiment in the accompanying drawings and described in the specification.

Reference is to be had to the accompanying drawings forming a part of this specification, in which similar characters of reference indicate corresponding parts in all the views, and in which Figure 1 is a vertical sectional view taken through the body of an automobile and the fly wheel pit of the crank case, and showing the manner of arranging and connecting my improved automatic oil indicator and feeder thereto; Fig. 2 is an enlarged vertical sectional view through the float chamber constituting a part of the device for supplying the oil to the crank case and operating the indicator and also disclosing the valve for controlling the supply of oil to the crank case; Fig. 3 is a horizontal sectional view taken on the line 3—3 of Fig. 2 and looking downwardly; and Fig. 4 is a detail view of a modified operating arrangement for the indicator disclosing the amount or height of the oil in the crank case.

In the preferred embodiment of the invention illustrated in Figs. 1, 2 and 3 of the drawings, an automobile body 10 is shown having the usual flooring 11 and dashboard 12 upon which are mounted, in the usual manner, the instrumentalities for controlling the sparking circuit, speed of the car, etc. A side rail or beam of the car is indicated by the numeral 13 the same being disposed in juxtaposition to the flanged portion 14 of the fly wheel pit 15 of the crank case.

The fly wheel pit is adapted to contain oil in the usual manner for the lubrication of the working parts, as in the well-known splash system, and in order to determine the height of the oil in the crank case the latter or its fly wheel pit is provided with an upper petcock 16 and a lower petcock 17, it being necessary to reach under the car in a most unsatisfactory and objectionable manner, to open one of the petcocks, depending upon the height at which it is desired to maintain the oil, so that if the oil exudes therefrom the proper height may be approximated but not accurately and definitely determined. The pit is also provided with an outlet 18 usually closed by a plug, which is removable for the purpose of draining and cleaning the crank case. In obviating the necessity of employing the petcocks 16 and 17 this plug is removed and an exteriorly threaded pipe section 19 engaged in the outlet, and in turn having connected thereto a 3-way joint 20 having a depending outlet or passage closed by a removable plug 21, which in this instance permits draining and cleaning of the crank case.

Supported beneath the body of the car is a float chamber 22, the same being suspended by means of a depending bracket 23 and preferably connected to the flange 14 and engaged at its lower end through an extension 24 of the base of the float chamber. The chamber is held in adjusted position by means of a binding screw 25 operating through the end of the extension 24 and frictionally contacting with the bracket, and in this manner the float chamber is capable of being readily supported in position or removed. The chamber communicates with the 3-way connection 20 at its lower end, this connection being made through a pipe or conduit 26 removably connected to the 3-way joint and the extension of the base 27 of the float chamber.

A float 28 is freely movable in the float chamber, the latter being preferably of circular cross section, and this float carries a vertically extending rod or stem 29 which is movable through a removable cap 30 of the chamber and also through the parts 11 and 14. The upper end of the rod or stem terminates at a suitable height in front of the dashboard to be conveniently seen, and said end carries a pointer 31 coöperating with an indicator plate 32 carried by the dashboard to indicate the amount or height of the oil in the crank case, and this is affected by the buoyancy of the oil in the float chamber, which will be at the same height owing to the fact that the crank case and chamber are in communication with each other and the oil will therefore seek its own level. As shown in Fig. 1 of the drawings, the indicator plate 32 is initialed "T. P. C." and this is to indicate when the level of the oil is at the top petcock 16, while the initials "B. P. C." indicates that the oil is at the bottom or lower petcock 17 when the pointer 31 is disposed in front of such markings. The "Danger" mark indicates when the oil has gone below the proper level, but since the oil will be automatically supplied to the crank case, this marking will only be necessary when the supply of oil is lacking.

The means provided for automatically supplying the oil in the crank case through the float chamber and for maintaining the same at a constant level, consists of a thimble or sleeve 33 having a closed inner end wall and an interiorly and exteriorly threaded outer end with an adjacent flange or shoulder 34. This thimble is threaded through an aperture in one side of the float chamber from the inside, so as to project outwardly of the chamber when the shoulder is in contact with the inner face thereof, the thimble being held in this position to form a liquid-tight joint by means of a jam nut 35. A supply pipe 36 leads from an oil reserve reservoir 37 suitably carried upon the car.

The reservoir is provided with a supply pipe or by-pass tube 38 leading from the bottom portion thereof and communicating with the supply pipe 36, the flow of oil being controlled by a pet cock 39. The height of the oil in the reservoir 37, which reservoir is filled through an opening closed by a plug 40, is ascertained by means of a glass gage 41 having the usual controlling valves and provided with a drain tube 42 which may lead to the top petcock of the crank case to insure proper supply of the oil to the latter. The thimble 33 is provided with an escape opening 43 in its top portion, providing a surrounding conical valve seat normally closed by a valve 44. The stem of the valve is vertically slidable through a depending guide 45 carried by the cap 30 of the float chamber, and the valve is held normally closed by spring means, in the form of a coiled spring 46 mounted between the apertured portion of the guide and an enlargement of the stem so as to exert downward pressure on the latter.

A standard or supporting arm 47 is provided near the inner end of the thimble and pivotally supports a plate-like lever 48, which in turn has one arm pivotally connected to the valve stem and which has its other arm apertured to slidably engage the float rod or stem 29. This stem is threaded and has mounted thereon an adjustable stop or nut 49 which may be vertically adjusted on the stem to regulate the time of opening the valve 44 when the oil in the float chamber and crank case is at a certain or predetermined level, so that the oil will be supplied to the chamber. Thus it will be seen that since the oil in the float chamber and crank case is at the proper level, the float will be elevated to raise the stop or nut 49 from the arm of the lever 48, whereby the spring 46 may act to close the valve 43. During this time the pointer 31 will indicate on the indicator plate 32 the level of the oil in the float chamber and crank case, but when the oil falls below a safe level, which may be predetermined by adjusting the nut 49 on the stem 29, the float will move downwardly in the float chamber and when the nut 49 abuts the apertured arm of the lever 48 the valve will be opened by raising of its stem against the action of the coiled spring 46 and the oil will flow into the float chamber until the float, due to the buoyancy of the oil, will raise the nut 49 out of contact with the lever.

A modified form of indicator operating mechanism or device is illustrated in Fig. 4 of the drawings, wherein the stem 29 is made only sufficiently long to permit proper adjustment of the nut 49 for coöperation with the lever 48 in opening the valve 43 and permitting it to close under the action of the spring 46, and in lieu of operating the pointer 31 by means of the stem to top portion of the float chamber has a lead-off tube 50 which communicates with a pressure gage 51 indicating the height of the oil in inches or centimeters. Thus, when the float is elevated sufficient air pressure will be created in the top portion of the float chamber to operate the pressure gage, which, by reason of the provision of the lead-off tube, may be provided at any convenient place or at the dashboard, in connection with cars with which the indicator mechanism heretofore described cannot be conveniently used. When the oil falls below a predetermined level, the suction or vacuum created in the float chamber by the downward movement of the float will release the pressure on the gage and the indication marked on same will be distinctly brought to view to warn the operator or chauffeur of the danger in proceeding farther.

The materials used in forming the float chamber can be of any suitable metal or glass, or a combination of metal and glass so that the oil in the tube may be visible to the operator.

Having thus described my invention, what I claim as new and desire to secure by Letters Patent is:—

1. In an automatic oil indicator and feeder for gasolene engines, the combination with a crank case and a vertically elongated supply chamber having communication therewith; of a float movable in the chamber and buoyed up by the fluid therein, a stem connected to the float extending vertically through the chamber; an indicator directly connected to the stem and operated by the rise and fall of the oil to render visible in front of the operator the amount of oil in the chamber and case, a supply pipe for oil communicating with the chamber, and means operated by the indicator operating means to supply oil to the chamber whereby the oil is maintained at a constant level.

2. An automatic oil indicator and feeder for the crank cases of motors, comprising a vertical chamber for containing a lubricant, pipe connections between the chamber and the drain opening of the crank case, a float in the chamber and buoyed up by the lubricant therein, a pointer operated by the rise and fall of the float in the chamber, a lubricant reserve tank leading into the chamber and having an outlet opening for supplying the lubricant therein, a valve normally closing in said opening, a stop carried by the float, and a pivotal connection coöperating with the valve and stop to automatically open the valve upon the fall of the float and permit the closing thereof upon the float rising to a predetermined level.

In testimony whereof I have signed my name to this specification in the presence of two subscribing witnesses.

CHARLES EDWARD HENKELMAN.

Witnesses:
JESSE A. FOLTZ,
CHAS. F. KAMMERER.